US012098584B2

(12) United States Patent
Eliasson et al.

(10) Patent No.: US 12,098,584 B2
(45) Date of Patent: Sep. 24, 2024

(54) DOOR OPERATOR SYSTEM

(71) Applicant: Assa Abloy Entrance Systems AB, Landskrona (SE)

(72) Inventors: Daniel Eliasson, Lund (SE); Magnus Abrahamsson, Loddekopinge (SE); Anton Hansson, Kivik (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 0 days.

(21) Appl. No.: 17/783,916

(22) PCT Filed: Dec. 15, 2020

(86) PCT No.: PCT/EP2020/086235
§ 371 (c)(1),
(2) Date: Jun. 9, 2022

(87) PCT Pub. No.: WO2021/144104
PCT Pub. Date: Jul. 22, 2021

(65) Prior Publication Data
US 2023/0012351 A1 Jan. 12, 2023

(30) Foreign Application Priority Data
Jan. 15, 2020 (SE) .................................... 2030012-5

(51) Int. Cl.
*E05F 15/67* (2015.01)

(52) U.S. Cl.
CPC ......... *E05F 15/67* (2015.01); *E05Y 2201/434* (2013.01); *E05Y 2201/47* (2013.01);
(Continued)

(58) Field of Classification Search
CPC ........ E05F 15/67; E05F 15/684; E05F 15/678
See application file for complete search history.

(56) References Cited

U.S. PATENT DOCUMENTS 2,747,863 A * 5/1956 Huppert .................. E05F 15/67 318/489
2,923,541 A * 2/1960 Gessell ................... E05F 15/41 160/189
(Continued)

FOREIGN PATENT DOCUMENTS

DE 10349904 10/2004
EP 0523630 1/1993
(Continued)

OTHER PUBLICATIONS

International Search Report and Written Opinion in PCT/EP2020/086235, mailed Apr. 6, 2021.
(Continued)

*Primary Examiner* — Catherine A Kelly
*Assistant Examiner* — Patrick B. Ponciano
(74) *Attorney, Agent, or Firm* — Wissing Miller LLP

(57) ABSTRACT

An overhead door operator system (1) for opening and closing an opening (2), comprising a door frame (3) comprising a first frame section (4) at a first side (7) of the opening (2) and a second frame section (6) at a second side (5) of the opening (2). The operator system further comprises a door (8) arranged to be moved between an open and closed (C) position, the door (8) being movably connected to the door frame (3) and a drive unit (10) mounted on the door (8), the drive unit (10) comprising at least one motor (11) arranged to move the door (8) from the closed position (C) to the open position (O). An elongated transmission member (19) extends along the first side (7) of the opening (2) and the first frame section (4). The drive unit (10) further comprises a driven transmission member (18) in driving connection with the motor (11).

9 Claims, 12 Drawing Sheets

(52) U.S. Cl.
CPC ... *E05Y 2201/684* (2013.01); *E05Y 2201/716* (2013.01); *E05Y 2201/724* (2013.01); *E05Y 2600/13* (2013.01); *E05Y 2600/312* (2013.01); *E05Y 2600/322* (2013.01); *E05Y 2600/45* (2013.01); *E05Y 2600/46* (2013.01); *E05Y 2600/626* (2013.01); *E05Y 2900/106* (2013.01)

(56) References Cited

U.S. PATENT DOCUMENTS

| | | | | |
|---|---|---|---|---|
| 3,012,520 | A * | 12/1961 | Curtis | E05F 15/41 192/116.5 |
| 3,336,968 | A * | 8/1967 | Curtis | E05F 15/67 160/188 |
| 5,803,149 | A * | 9/1998 | Halley | E05F 15/686 160/201 |
| 6,276,744 | B1 | 8/2001 | Huber et al. | |
| 7,048,029 | B2 * | 5/2006 | Rieder | E05F 15/67 49/358 |
| 7,372,225 | B2 * | 5/2008 | Murphy | E05F 15/686 318/445 |
| 7,856,758 | B2 * | 12/2010 | Ressel | E05F 15/603 49/362 |
| 2008/0127560 | A1 * | 6/2008 | Harvey | E05F 15/686 49/199 |
| 2008/0245484 | A1 * | 10/2008 | Tillman | E05D 13/003 160/193 |
| 2012/0180959 | A1 | 7/2012 | Gunton et al. | |
| 2020/0362615 | A1 * | 11/2020 | Van De Wiel | E05F 15/668 |

FOREIGN PATENT DOCUMENTS

| | | | |
|---|---|---|---|
| EP | 1462601 | 9/2004 | |
| EP | 1496185 | 1/2005 | |
| FR | 1525946 | 5/1968 | |
| WO | 2019048395 | 3/2019 | |
| WO | WO-2019048392 A1 * | 3/2019 | E05D 15/22 |

OTHER PUBLICATIONS

Swedish Search Report in 2030012-5 mailed Jun. 8, 2020.
European Office Action in Application No. 20 835 723.6, dated Mar. 22, 2024.

* cited by examiner

DOOR OPERATOR SYSTEM

This application is a 371 of PCT/EP2020/086235, filed on Dec. 15, 2020, published on Jul. 22, 2021 under publication number WO 2021/144104, which claims priority benefits from Swedish Patent Application No. 2030012-5, filed on Jan. 15, 2020, the disclosure of which is incorporated herein by reference.

TECHNOLOGY FIELD

The present invention relates to an overhead door operator system for opening and closing an opening.

BACKGROUND

A door operator system for an overhead door typically comprises a door connected to a door frame and a drive unit arranged to move the door along the door frame between an open and closed position for opening and closing the opening. The door, which may be a sectional door, is typically used as a garage doors or as an industrial door. The drive unit can further comprise a motor or a mechanical unit such as a spring to move the door.

In conventional overhead sectional door an electric motor mounted above the door pulls up the door using wires attached to the door. Such an overhead sectional door often implements balancing springs to reduce the force required to open the door. The implementation of a balancing spring increases the complexity of the door and is cumbersome to install when the door is mounted into position.

To achieve a more efficient door operator system that reduces the complexity and the risks of the door operator system during operation, maintenance and installation, a door operator system with drive units mounted to the door has been developed. The door is driven by means of driven pinions interfacing with a fixed rack extending along the intended movement trajectory of the door. Such a door addresses several shortcomings and disadvantages with conventional door operator systems by introducing a drive modularity, which allows for easier and faster installation and a reduced complexity. Additionally, it does not require a balancing spring.

However, the driving of such a door is associated with a number of challenges. The fixed rack requires a high accuracy in manufacturing and proper aligning of the racks when the door is installed. This increases the cost both for the door itself and the installation of the door.

To address the challenge, a chain drive may be implemented. In such a system, driven sprockets on the door may interface with chains extending next to the door. As is known to the skilled person a number of types of overhead door systems are available based on the conditions set by the building wherein the door is to be implemented.

If the wall above the opening in the wall is at least equally high as the door a so called Vertical Lift overhead door system may be suitable. In such an overhead door system, the chain is fixed in the top part of the tracks, and the door travels up the chain using the sprocket engaged in the chain. The chain is more or less parallel with the track. Hence, the tracks extends straight from the bottom to the top, and the door is moving vertically all the way up.

In many cases such a large space is not available for installation of the overhead door system. In such cases other types of overhead sectional door systems which are called HL (High Lift), SL (Standard Lift) or LL (Low Lift) overhead door systems may be implemented. Such systems has tracks which bend at an angle that can be horizontal over the opening, allowing for mounting in applications with limited ceiling height. The difference between HL and SL is that in HL the track bend starts higher up, allowing the bottom panel of the door to remain on the vertically extending part of the track even when the door is fully open. This also requires a wall with substantial height over the door opening to be available.

It is sometimes desirable to have as low area as possible above the door opening, and in those situations the SL or even the LL can be used. Here, the track bend is placed so low that the bottom panel has partly travelled through the bend when fully opened. HL, SL and LL overhead door systems may be considered as up-and-over overhead door systems. In such systems it is difficult to allow for the bottom panel in the door to travel in the track bend of the track system. The object of the present invention is to achieve an overhead door system with drive units mounted to the door which addresses the challenge of the bottom panel travelling through the track bend of the track system.

SUMMARY

An object of the present disclosure is to provide an overhead door operator system which seeks to mitigate, alleviate, or eliminate one or more of the above-identified deficiencies in the art and disadvantages singly or in any combination.

An object of the present invention is to reduce the complexity of the overhead door operator system.

According to one aspect an overhead door operator system for opening and closing an opening is provided. The overhead door operator system comprises a door frame comprising a first frame section at a first side of the opening and a second frame section at a second side of the opening. Each of the first frame section and the section frame section comprising a vertically extending part, a horizontally extending part and a bent interconnecting part. The overhead door operator system further comprises a door arranged to be moved between an open and closed position, the door being movably connected to the door frame. The door comprises a plurality of horizontal and interconnected sections.

Additionally, the operator system comprises a drive unit mounted on the door, the drive unit comprising at least one motor arranged to move the door from the closed position to the open position and an elongated transmission member extending along the first side of the opening.

The drive unit further comprises a driven transmission member in driving connection with the motor, the driven transmission member being movably connected to the elongated transmission member and arranged to interplay with said elongated transmission member for driving the driven transmission member along said elongated transmission member by means of the elongated transmission member at least partially wrapping around the driven transmission member.

The overhead door operator system further comprises a transmission mounting arrangement for attaching the elongated the transmission member. The transmission mounting comprises a fixing point to which the elongated transmission member is mounted. The fixing point is arranged at a distance in the direction of the horizontally extending part relative the vertically extending part at least when the door is in the open position.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

A reference to an entity being "designed for" doing something in this document is intended to mean the same as the entity being "configured for", or "intentionally adapted for" doing this very something.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
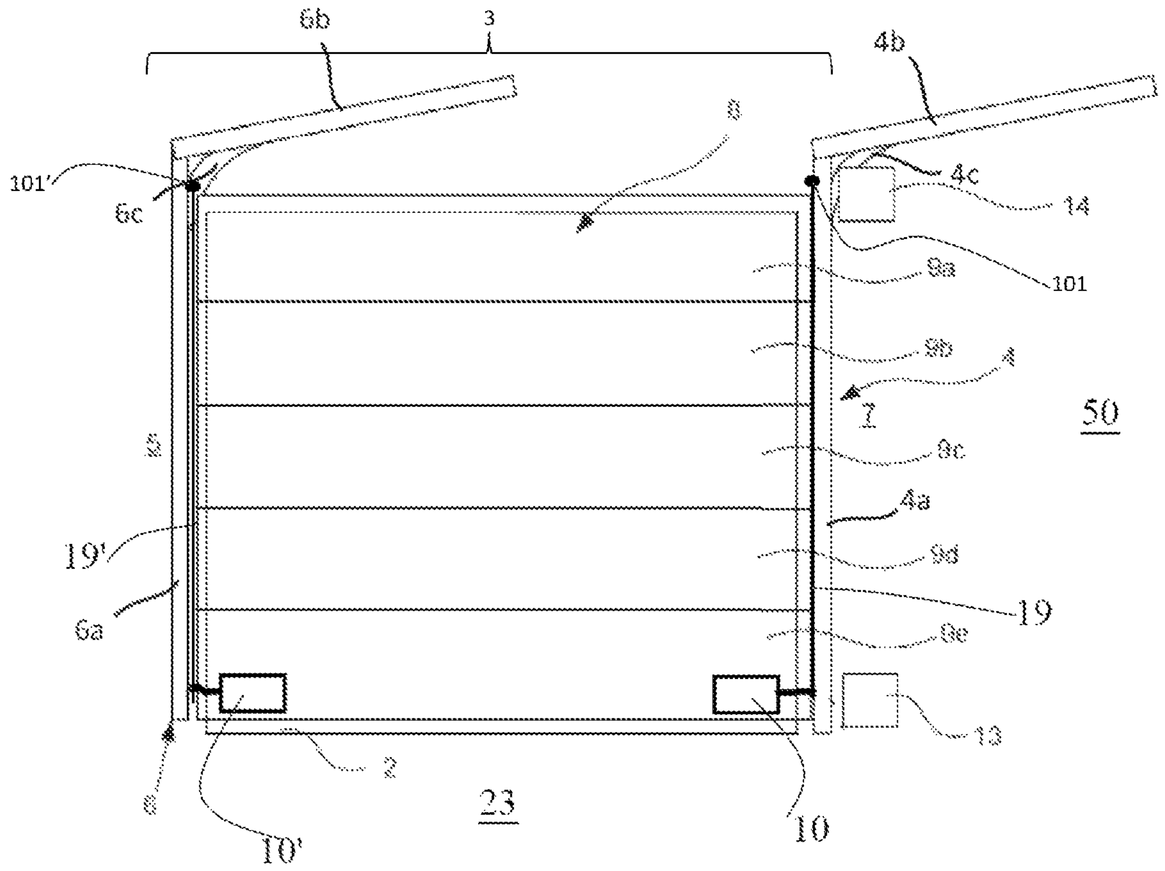
FIG. 1 is a schematic perspective view of a door operator system comprising a door in a closed position.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 is schematic views of a door operator system 1 in which the inventive aspects of the present invention may be applied. The door operator system comprises a door frame 3, a drive unit 10 (shown in FIG. 2*a-c*) and a door 8. The door operator system 1 is arranged to be installed in an opening 2 defined by a wall and a floor. The door 8 is connected to the door frame 3. The door operator system 1 is arranged to open and close the opening 2 by moving the door 8 between an open position O and a closed position C. The open position O may be a horizontal open position O, in the form of a planar horizontal position or an inclined horizontal position. The closed position C may be a vertical closed position C.

An overhead door operator system herein refers to a door operator system which is arranged to open and close the opening 2 by means of lowering and lifting of the door 8.

In this embodiment, the door 8 is a sectional door 8 comprising a plurality of horizontal and interconnected sections 9*a-e* connected to the door frame 3. In one embodiment, the door is a garage door. In an alternative embodiment, the door is an industrial door. The door 8 is arranged to be moved along the door frame 3 between the closed position C and the open position O.

As shown in FIG. 1, the door operator system 1 may comprise a first terminal 13 and a second terminal 14. The at least one terminal 13, 14 is configured to transmit energy for charging an energy storage device, such as a battery, for powering the motor of the drive unit. In an alternative embodiment, power may be supplied to motor of the drive unit by means electric wiring.

The door operator system is an up and over door operator system. A up and over door operator system is a system in which the door in the closed position C is arranged substantially vertical and in the open position O is arranged substantially horizontal and inside of the opening.

In an alternative embodiment, the door operator system may be a door operator system in which the door in the closed position C is arranged substantially vertical and in the open position O is arranged in an inclined position disposed between a substantially vertical and a substantially horizontal position. For example, the door may be arranged at a 45° angle from a horizontal position in the open position O, as the skilled person recognizes however the door may be arranged at any angle disposed between the horizontal and vertical orientation of the door in the open position O.

The door frame 3 comprises a first frame section 4 at a first side 7 of the opening 2 and a second frame section 6 at a second side 5 of the opening 2. The door frame 3 is connected to the wall 50 and to the floor 23, i.e. the floor of the opening 2. In one embodiment, the first frame section 4 comprises a substantially vertically extending part 4*a* and a substantially horizontally extending part 4*b*. The second frame section 6 comprises a substantially vertically extending part 6*a* and a substantially horizontally extending part 6*b*. The vertically extending part 4*a*, 6*a* and the horizontally extending part 4*b*, 6*b* are connected to create a path for the door 8 to glide on and a track for the drive unit 10 to interact with.

Thus, each of the first frame section 4 and the second frame section 6 comprising a vertically extending part 4*a*, 6*a*, a horizontally extending part 4*b*, 6*b* and a bent interconnecting part 4*c*, 6*c*. Worded differently, The first frame section 4 comprises a vertically extending part 4*a*, a horizontally extending part 4*b* and a bent interconnecting part 4*c*. The bent interconnecting part 4*c* thus connects the vertically extending part 4*a* and the horizontally extending part 4*b*. Similarly, the second frame section 6 comprises a vertically extending part 6*a*, a horizontally extending part 6*b* and a bent interconnecting part 6*c*. The bent interconnecting part 6*c* thus connects the vertically extending part 6*a* and the horizontally extending part 6*b*.

The vertically extending parts 4*a*, 6*a* may be vertical parts 4*a*, 6*a* or inclined vertical parts 4*a*, 6*a*. Similarly, the horizontally extending parts 4*b*, 6*b* may horizontal parts 4*b*, 6*b* or inclined horizontal parts 4*b*, 6*b*.

Referencing FIG. 1, the door 8 is directly or indirectly connected to the door frame 3. The door 8 is at a first side moveably connected to the first frame section 4 and at a second side moveably connected to the second frame section 6. In one embodiment, one or more of the plurality of sections 9*a-e* is connected to the first frame section 4 at said first side 7 and to the second frame section 6 at said second side 5.

With reference to FIG. 2*a-e*, the drive unit 10 is mounted on the door 8. The drive unit 10 comprises at least one motor 11. The at least one motor 11 is arranged to move the door 8 from the closed position C to the open position O.

To allow for the driving of the door 8, the overhead door operator system 1 further comprises an elongated transmission member 19 extending along the first side 7 of the opening 2. The elongated transmission member 19 may further extend along the first frame section 4. The drive unit 10 further comprises a driven transmission member 18 which is in driving connection with the motor 11. The driven transmission member 18 is movably connected to the elongated transmission member 19 and arranged to interplay with said elongated transmission member 19 for driving the driven transmission member 18 along said elongated transmission member 19 by means of the elongated transmission member 19 at least partially wrapping around the driven transmission member 18. Thus, the elongated transmission member 19 is arranged to at least partially envelope said driven transmission member 18.

The elongated transmission member does in comparison with a fixed rack provide a more cost-efficient solution both in terms of manufacturing and installation. Furthermore, the elongated transmission member allows for relative movement between the door 8 and the frame and does not require a high accuracy and proper aligning in the same manner as a fixed rack solution. The elongated transmission member may thus be arranged to allow for a degree of movement along a direction orthogonal to the first frame section 4.

Further, the elongated transmission member enables a safer door operator system due to said elongated transmission member following and keeping the engagement with the driven transmission member, at least to some extent, even if the door is pushed away from the rail. In addition, the elongated transmission member is more silent and resistant to wear compared to a fix rack and less likely to malfunction due to pinching of external objects.

The elongated transmission member 19 may be in the form of a bendable transmission member. The elongated transmission member 19 may be in the form of a suspended transmission member. It is noted that bendable in this context does not necessarily imply that said transmission member necessarily is flexible but only that it allows for wrapping around the driven transmission member. Accordingly, the transmission member 19 may be considered to be arranged to be in engagement with the driven transmission member 18 and provide for relative movement between the driven transmission member 18 and a direction of movement of the door 8 as defined by the frame 3. Worded differently said transmission member may be considered as a non-fix transmission member or a suspended transmission member. The elongated transmission member may accordingly be arranged to engage the driven transmission member independently of the frame.

The drive unit 10 is moveably connected to the elongated transmission member 19. Accordingly, drive unit 10 is connected to said elongated transmission member 19 so as to allow for relative movement between the door and the frame, whereby the drive unit is fix to the door. The drive unit 10 comprises at least one motor 11. The drive unit 10 is arranged to move the door 8 from the closed position to the open position. To provide power to the motor 11, the at least one motor 11 may be connected to at least one energy storage device, such as a battery, arranged to power the at least one motor 11. The drive unit 10 is arranged to move the door 8 from the closed position C to the open position O.

In one embodiment, the drive unit 10 is arranged to move the door from the open position O to the closed position C. In one embodiment, the door 8 is arranged to move from the open position O to the closed position C by means of the weight of the door 8. In one embodiment, the drive unit 10 is arranged to brake the door 8 when moving from the open position O to the closed position C.

In one embodiment, the elongated transmission member may be suspended only by means of a top end and a bottom end.

The elongated transmission member 19 may be biased. The biasing of the elongated transmission member 19 enables keeping of the tension of the resilient elongated member 19 at a suitable level and further compensates for wear and potential tolerance issues.

In one embodiment, the elongated transmission member 19 may be biased by means of a spring arrangement. A top end of the elongated transmission member 19 may be fixedly mounted and a bottom end of said elongated transmission member 19 may be spring-loaded. This allows for easier access for an operator performing service work involving the spring. In one embodiment, the top and bottom end of the elongated transmission member 19 is mounted to the frame, for example the first frame section 4.

In one embodiment, the overhead door operator system further comprises at least one guide member 92. The at least one guide member 92 is mounted to the door 8. The guide member 92 may be arranged to interplay with the elongated transmission member 19 for guiding the door 8 along the elongated transmission member 19 by means of the elongated transmission member 19 at least partially wrapping around the at least one guide member 92. The guide member 92 thus moves the elongated transmission member 19 and guides the driven transmission member 18 in relation to said elongated transmission member 19 to properly align them. Hence, a more reliable door operator system may be achieved. The guide member 92 may preferably be a rotatable guide member which may be mounted to the door 8 by means of a journaled connection. Thus, the elongated transmission member 19 is arranged to at least partially envelope said guide member 92.

Referencing FIG. 2*a-e*, the elongated transmission member 19 may be arranged to wrap around and interplay with a portion of the driven transmission member 18 and a portion of the guide member 92. The portion of the driven transmission member 18 interplaying with the elongated transmission member 19 being opposite to the portion of the guide member 92 interplaying with said elongated transmission member 19. This achieves a larger interface between the driven transmission member, guide member and elongated transmission member, whereby a more stable overhead door operator system which requires less torque to operate may be achieved.

As shown in FIG. 2*a-e*, the elongated transmission member 19 is preferably suspended along the first side of the opening.

The elongated transmission member 19 may be any conventional elongated transmission member 19 providing the required slack to compensate for horizontal or diagonal movement of the drive unit and/or door. The elongated transmission member may be a belt or a chain.

In one embodiment, the elongated transmission member 19 may be a belt. Thus, the guide member 92 and the driven transmission member 18 may be pulley elements arranged to interface with said belt. In one embodiment, the belt may be a cogged belt or a ribbed belt, whereby the guide member 92 and the driven transmission member 18 may be cogged wheels interfacing with the ribs of said cogged or ribbed belt.

Figure 2A:
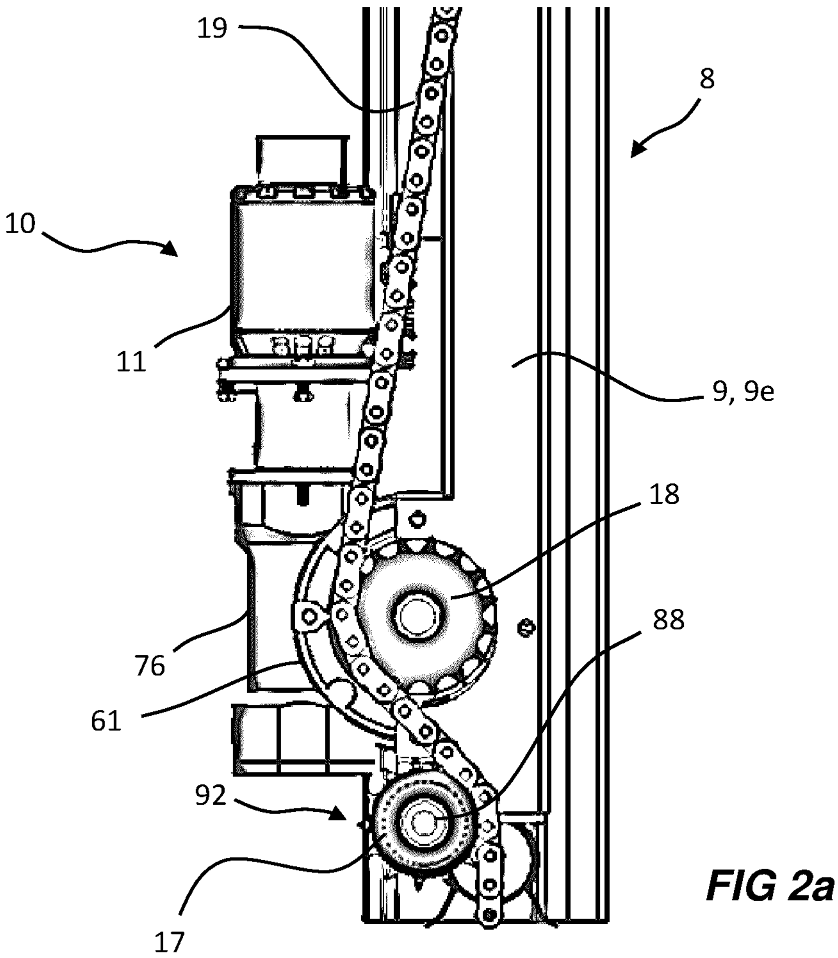
FIG. 2*a* is a schematic perspective view of a drive unit according to an embodiment.
Figure 2B:
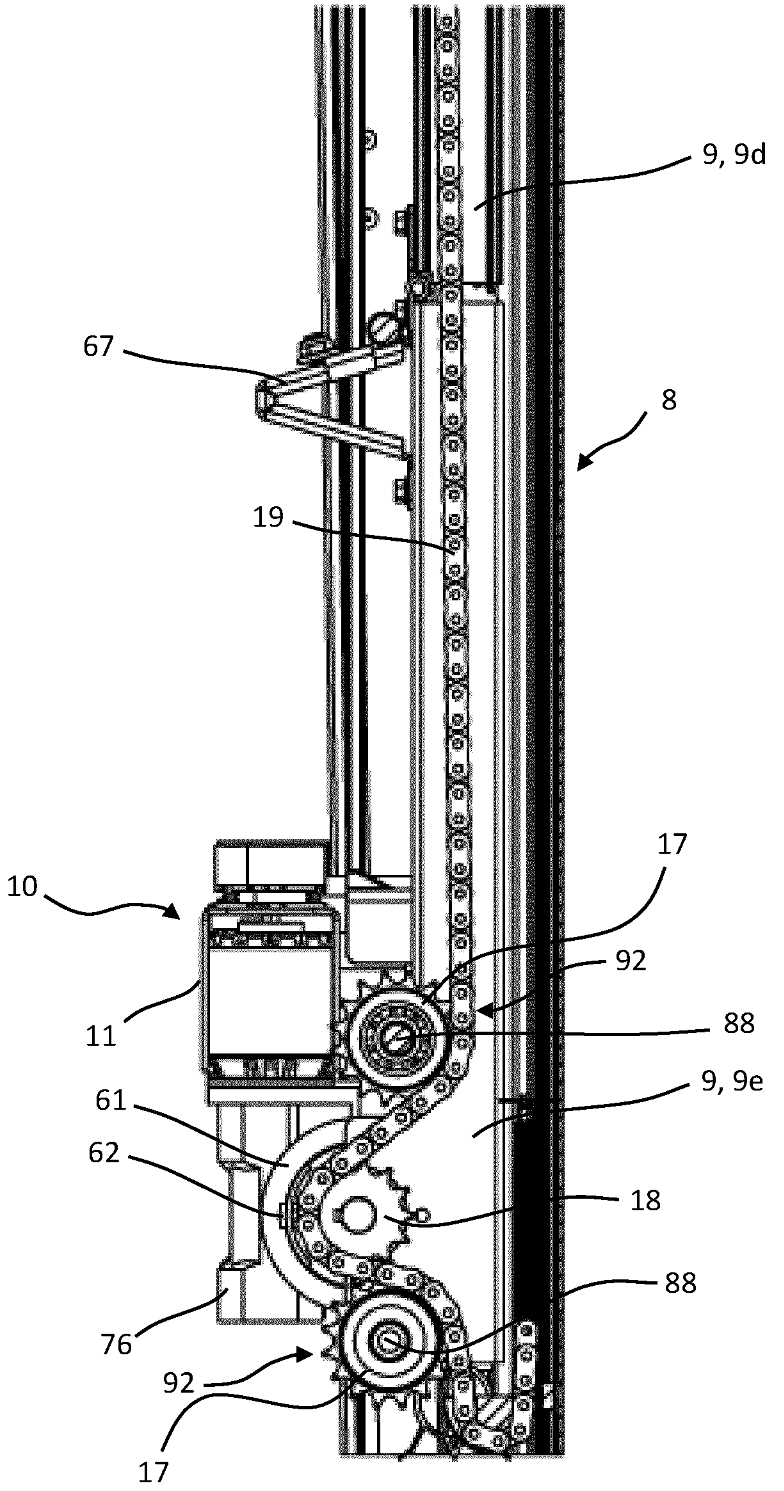
FIG. 2*b* is a schematic perspective view of a drive unit according to an embodiment.
Figure 2C:
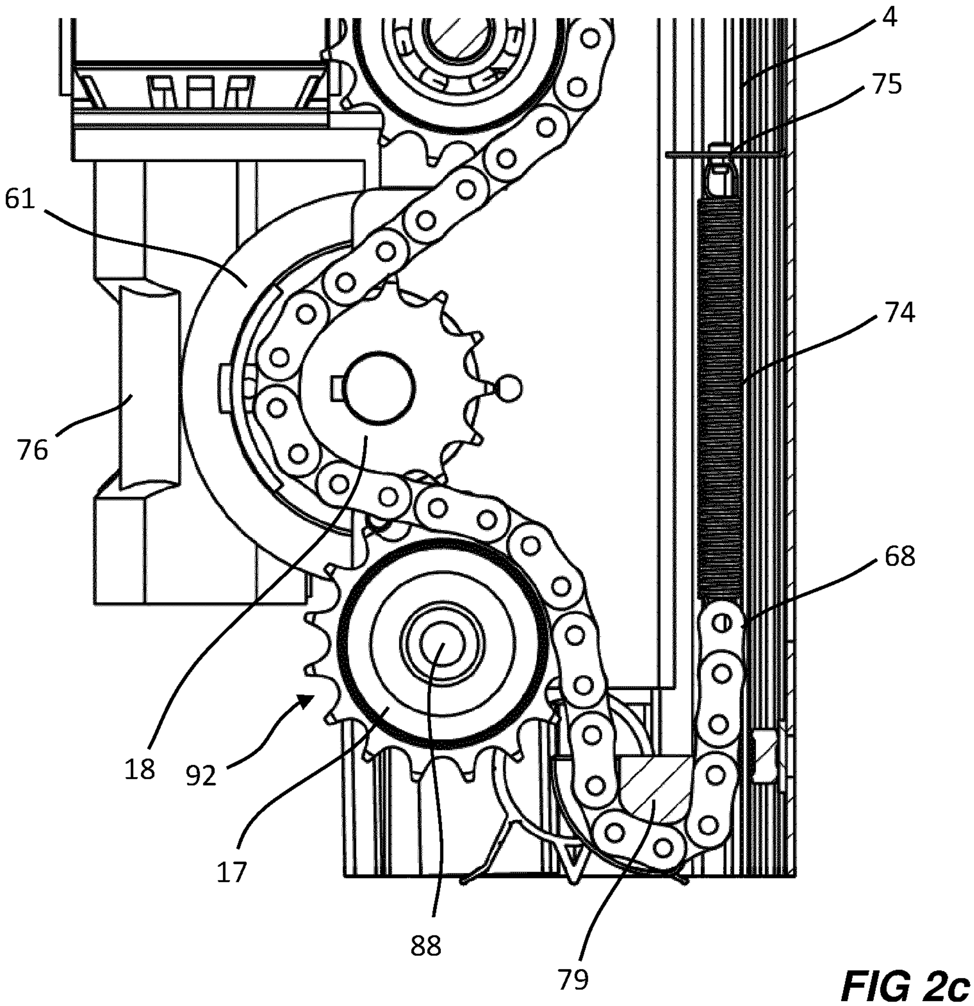
FIG. 2*c* is a schematic perspective view of a drive unit according to an embodiment.

The elongated transmission member 19 may also be a chain, which is depicted in FIG. 2*a-c*. The chain may be provided with slots for receiving cogs. Accordingly, the driven transmission member 18 may be a cogged wheel arranged to interplay with the chain, e.g. the slots of the chain. The driven transmission member 18 may be a sprocket. Further, the guide member 92 may be a cogged wheel arranged to interplay with the chain, e.g. the slots of the chain. The guide member 92 may be a sprocket. In one embodiment, the guide member 92 may be a ribbed wheel for interplaying with the chain. In one embodiment, the chain is an endless chain enveloping the guide member(s) and the driven transmission member(s). In one embodiment, the chain is a non-endless chain, e.g. a single chain only partially enveloping the guide member(s) and the driven transmission member(s).

In one embodiment, the overhead door operator system further comprises a first set of guide rollers 17 and a second set of guide rollers 17. Said first and second set of guide rollers are mounted to the door 8. The first set of guide rollers 17 are arranged to interplay with the first frame section 4 and the second set of guide rollers 17 are arranged to interplay with the second frame section 6. The guide rollers thus moves together with the door 8 in a guided manner along the trajectory formed by the frame, e.g. the first frame section 4 and the second frame section 6.

In one embodiment, the door 8 is a sectional door. Hence, the door comprises a plurality of horizontal and interconnected sections 9*a-e* (as depicted in FIG. 1).

Again referring to FIG. 2*a-c*, the drive unit 10 is mounted on a section 9*e* of the door 8. To make the movement of the section smoother, the section onto which the drive unit 10 is mounted is provided with two pairs of guide rollers. A first and second upper guide roller accordingly extend from the section 9*e* towards the first frame section 4 and the second frame section 6, respectively. Similarly, a first and second lower guide roller extend from the section 9*e* towards the first frame section and the second frame section 6, respectively.

In one embodiment, the drive unit 10 is mounted to the bottommost section 9*e* of the door 8. According to such an embodiment, the first and second lower guide roller may be disposed adjacent to a bottom horizontal end phase of the bottommost section 9*e*. The upper guide rollers may correspondingly be disposed adjacent to a top horizontal end phase of the bottommost section 9*e*.

In one embodiment, upper and lower guide rollers may be mounted to each section 9*a-e*. Preferably, the upper guide rollers are disposed adjacent to the upper horizontal end phase and the lower guide rollers are disposed adjacent to the bottom horizontal end phase of each section.

Figure 2D:
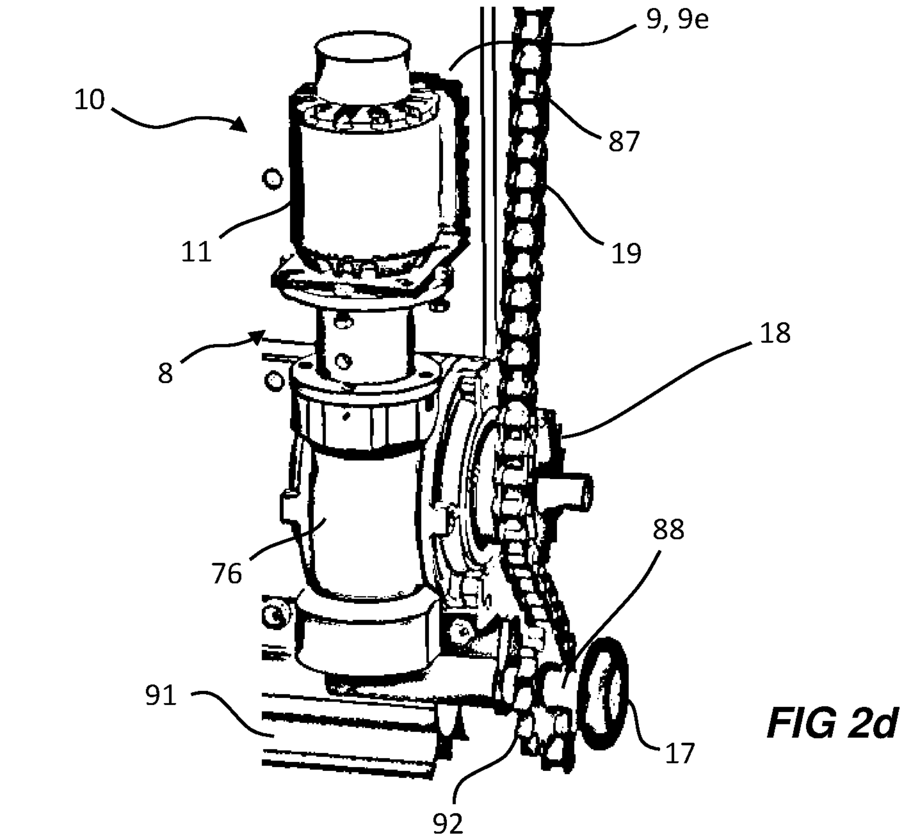
FIG. 2*d* is a schematic perspective view of a drive unit according to an embodiment.

The at least one guide member 92 may be, as most clearly depicted in FIG. 2*d*, arranged coaxially with one of the guide rollers 17. The coaxial arrangement reduces the force on the guide member due to the frame and guide roller taking up some of the load during the movement of the door. Hence, resulting forces to the door sections and bearings of the drive unit and/or guide member are reduced. Furthermore the coaxial arrangement allows for more of the elongated transmission member to be disposed behind the guide rollers which decreases the exposure of said elongated transmission member. The guide roller 17 is mounted to the door 8 by means of a shaft 88. Both the guide roller 17 and the guide member 92 are mounted to the shaft. The guide member 92 may be fixedly attached to the shaft 88. Advantageously, the guide roller 17 and the guide member 92 may be arranged adjacent to the bottom horizontal edge of the door 8. In one embodiment, the guide member is integrated into the guide roller.

As seen in said FIG. 2*a-d* coaxial herein implies that the guide roller and the guide member are arranged parallel to each other along a horizontal axis extending. The horizontal axis extends between the first and second frame section.

In one embodiment, the guide member is coaxial with the guide roller being disposed adjacent to a bottom horizontal end phase of the bottommost section 9*e* of the door. This is particularly advantageous due to it providing a superior pivoting position of the door. The guide roller and the guide element hence creates a common low pivot point for the door when the door is approaching its open position O when the overhead door operator system is an up and over door operator system. This significantly reduces the space required above the door opening compared to for example a door with driven sections utilising for example a fix rack.

In one embodiment, a first upper guide member 92 is arranged coaxially with the first upper guide roller 17. Correspondingly, a first lower guide member 92 is arranged coaxially with the first lower guide roller 17. Hence, the section 9*e* which is driven may be both guided along the elongated transmission member 17 and the frame at the same axes. This further increases the stability and decreases the load on the section onto which the drive unit 10 is mounted. Preferably, the section is the bottommost section and the lower guide member and the lower guide wheel are arranged adjacent to the bottom phase of said bottommost section. Hence, one of the guide rollers 17 and one of the guide member 92 may be arranged coaxially to each other adjacent to the bottom horizontal edge of the door 8. This may be the case in a single section door as well.

In one embodiment shown in FIG. 1, the overhead door operator system comprise a pair of elongated transmission members 19, 19' to allow for a more stable movement pattern of the door 8. A first elongated transmission member 19 extends along the first side 7 of the opening 2 from a first fixing point 101 located above vertical portion 4*a* of first frame section 4. The first elongated transmission member 19 may further extend along the first frame section 4. A second elongated transmission member 19' extends along the second side 5 of the opening 2 from a second fixing point 101' located above vertical portion 6*a* of second frame section 6. The second elongated transmission member 19' may further extend along the second frame section 6. The guiding and driving arrangements discussed with reference to the first side of the door may accordingly be mirrored to the second side of the door.

Thus, the overhead door operator system may further comprise a first and second driven transmission member 18 arranged to interplay with the first and second elongated member 19 by means of the first and second elongated transmission member at least partially wrapping around the first and second driven transmission member, respectively.

The first and second driven transmission member 18 may be driven by means of a single or multiple motors 11, 11', as shown in FIG. 1. In one embodiment, a single motor 11 is in driving connection with the first and second transmission member 18. The single motor 11 may be connected to the first and second driven transmission members 18 by means of a first and second shaft extending from the motor 11. As will be further described with reference to FIG. 3, the drive unit 10 may comprise a first and a second motor 11*a*, 11*b* each being in driving connection with the first and second driven transmission member 18, respectively.

Analogously to the first vertical side of the door, the second side of the door may have one or more guide members mounted thereon. In one embodiment, the overhead door operator system further comprises at least one guide member 92 mounted to the door 8 arranged to interplay with the second elongated transmission member for guiding the door 8 along the second elongated transmission member 17 by means of the second elongated transmission member at least partially wrapping around said guide member. Worded differently, said door operator system comprises at least one first guide member 92 mounted on the door 8 arranged to interplay with the first elongated transmission member 19 and at least one second guide member 92 mounted on the door 8 arranged to interplay with the second elongated transmission member 19 by means of the first and second elongated transmission member at least partially wrapping around the first and second guide member, respectively.

Both the elongated transmission members 19 may be biased by means of spring arrangements. A top end of the elongated transmission members 19 may be fixedly mounted and a bottom end of said elongated transmission members 19 may be spring-loaded. This allows for easier access for an operator performing service work involving the spring. In one embodiment, the top and bottom ends of the elongated transmission members 19 are mounted to the frame, e.g. to the first and second frame section, respectively.

In one embodiment, which is exemplified in FIG. 2*b*, the first driven transmission member 18 may be arranged between a first upper and a lower guide member 92. The first upper and lower guide member 92 are arranged to interplay with the first elongated transmission member 19 by means of the first elongated transmission member at least partially wrapping around the first upper and lower guide member. Similarly, the second driven transmission member 18 may be arranged between a second upper and a lower guide member 92. The second upper and lower guide member 92 are arranged to interplay with the second elongated transmission member by means of the second elongated transmission member at least partially wrapping around the second upper and lower guide member. This enables additional guiding of the elongated transmission member(s) both before and after the driven transmission member(s) in the driving direction without requiring a surplus of components. Hence, a less complex operator assembly may be achieved. Further, this achieves a larger interface between the elongated transmission member and the guiding members over the driven transmission member, resulting in a more stable door operator system which requires less torque to operate.

The first and second driven transmission member 18 may thus be arranged to extend from the door 8 in opposite directions towards the first and second elongated transmission member 19, respectively. The first driven transmission member 18 may be arranged proximal to a first vertical phase of the door, said first phase being adjacent to the first elongated transmission member when the door is in the closed position. Similarly, the second driven transmission member 18 may be arranged proximal to a second vertical phase of the door, said second phase being adjacent to the second elongated transmission member when the door is in the closed position.

The elongated transmission members 19 may be arranged to wrap around and interplay with a portion of the driven transmission member 18 and a portion of the upper and lower guide members 92. The portion of the driven transmission member 18 interplaying with the elongated transmission member 19 being opposite to the portions of the upper and lower guide member 92 interplaying with said elongated transmission member 19. This achieves a larger interface between the driven transmission member, guide member and elongated transmission member, whereby a more stable overhead door operator system which requires less torque to operate may be achieved.

In one embodiment, wherein only a first elongated transmission member is in driving connection with the transmission member, the door operator system may only comprise a first upper and lower guide member according to the above.

In one embodiment wherein the drive unit 10 is mounted to a section 9*e* of the door 8, a first upper guide member 92 arranged to interplay with the first elongated transmission member 19 may be arranged adjacent to a top phase of the section 9*e*. A first lower guide member 92 arranged to interplay with the first elongated transmission member 19 may be arranged adjacent to a bottom phase of the section 9*e*. A second upper guide member 92 arranged to interplay with the second elongated transmission member 19 may be arranged adjacent to a top phase of the section 9*e*. A second lower guide member 92 arranged to interplay with the second elongated transmission member 19 may be arranged adjacent to a bottom phase of the section 9*e*.

In one embodiment, the first upper guide member 92 may be arranged coaxially with the first upper guide roller (17) for interplaying with the first elongated transmission member 19 by means of the first elongated transmission member at least partially wrapping around the first upper and lower guide member. The first lower guide member 92 may be arranged coaxially with the first lower guide roller 17 for interplaying with the first elongated transmission member 19. The second upper guide member 92 may be arranged coaxially with the second upper guide roller 17 for interplaying with the second elongated transmission member 19 by means of the second elongated transmission member at least partially wrapping around the second upper and lower guide member. The second lower guide member 92 may be arranged coaxially with the second lower guide roller 17 for interplaying with the second elongated transmission member 19.

As depicted in FIG. 2*a-e*, the drive unit 10 may comprise a reduction gearing 76 to provide additional torque between the motor and the driven transmission member 18. The reduction gearing 76 connects the driven transmission member 18 and the motor 11. The reduction gearing may be in the form of a gearbox 76. A gearbox 76 enables selective torque control between for example a high speed mode and a high torque mode of the door operator system.

In one embodiment wherein the drive unit 10 comprises a single motor, the motor is connected to the reduction gearing 76 which may be in the form of the gearbox, whereby an output shaft of the gearbox is connected to the first and second driven transmission member 18 so as to transfer torque to said first and second driven transmission member 18, or in the case of the operator system only having one elongated transmission member, the single driven transmission member.

In one embodiment wherein the drive unit 10 comprises the first and second motor. The first motor may be connected to a first reduction gearing, such as a gearbox, in turn connected to the first driven transmission member. The second motor may be connected to a second reduction gearing, such as a gearbox, in turn connected to the second driven transmission member.

The overhead door operator system may further comprise at least one transmission member protector 61. The transmission member protector 61 is arranged to at least partially enclose the driven transmission member 18 and a portion of the elongated transmission member 19 interplaying with said driven transmission member 19. The transmission member protector 61 is for preventing the elongated transmission member 19 being brought out of engagement with the driven transmission member 18. Hence, a safer overhead door operator system may be achieved. The transmission member protector 61 may also serve as a mean to prevent a human to come into contact with the elongated transmission member 19.

The transmission member protector 61 may be arranged to extend outwardly, i.e. horizontally, from the door 8 across the elongated transmission member 19 to cover said elongated transmission member 19. The transmission member protector 61 may be attached to the door 8 or the drive unit 10.

In one embodiment, in which a plurality of driven transmission members 18 are utilized, the overhead door operator system may comprise a plurality of transmission member protectors 61. Each transmission member protector 61 may be arranged to at least partially enclose a corresponding driven transmission member 18 and the portion of the elongated transmission member 19 interplaying with said driven transmission member 18.

In one embodiment, the overhead door operator system may further a transmission member tensioner for spring-loading the elongated transmission member 19, wherein the top and bottom end of the elongated transmission member 19 are fixedly mounted and the transmission member tensioner is attached to the door 8. The transmission member tensioner may comprise a roller element arranged to interplay with the elongated transmission member 19.

As depicted in FIG. 2*c*, the overhead door operator system may comprise a spring arrangement 74. The bottom end 68 of the elongated transmission member 19 may be attached to a fix point by means of said spring arrangement 74. The fix point may be a point on the frame or the floor. As depicted in said FIG. 3*c*, the spring arrangement 74 may be connected to the frame 3, for example the first frame section 4, and the bottom end 68 of the elongated transmission member 19. The elongated transmission member 19 may be routed downwards around a console element 79 disposed adjacent to the floor of the opening and upwards towards the spring arrangement 74.

Figure 2E:
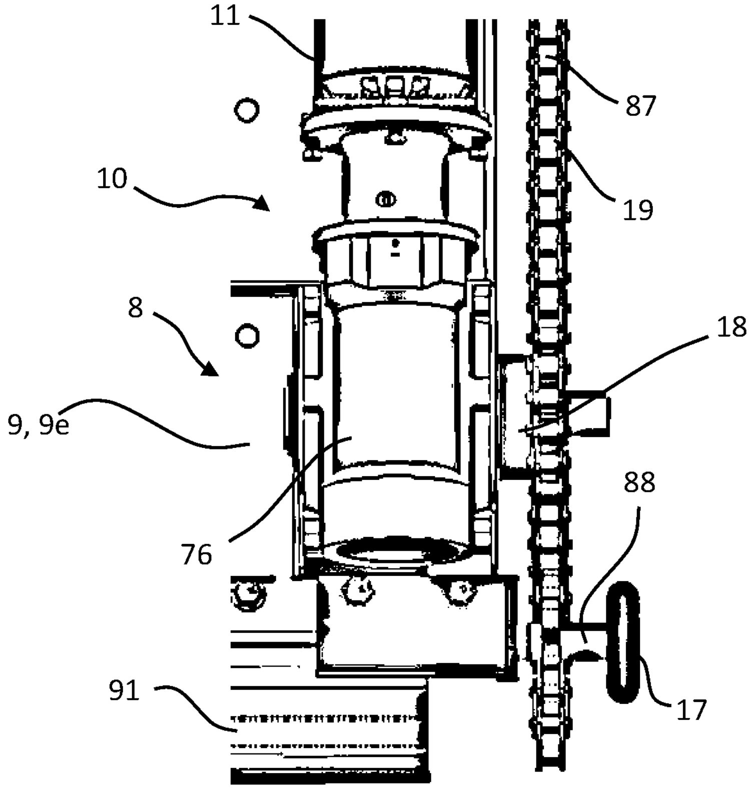
FIG. 2*e* is a schematic perspective view of a drive unit according to an embodiment.

As seen in FIG. 2*d-e*, the overhead door operator system may further comprise a resilient panel 91. The resilient panel 91 is attached to the door 8. The resilient panel 91 extends from the bottom horizontal edge 8 of the door and is further arranged to come into contact with a floor of the opening 2 when the door is in the closed position C. Said resilient panel 91 deforms when coming into contact with the floor upon the door 8 closing, whereby the door 8 is protected from the impact and wear due to coming into direct contact with the floor. Further the resilient panel 91 may provide a sealing effect between the floor and the door when the door is in the closed position. In one embodiment, the resilient panel 91 may be in a rubber material.

Figure 3:
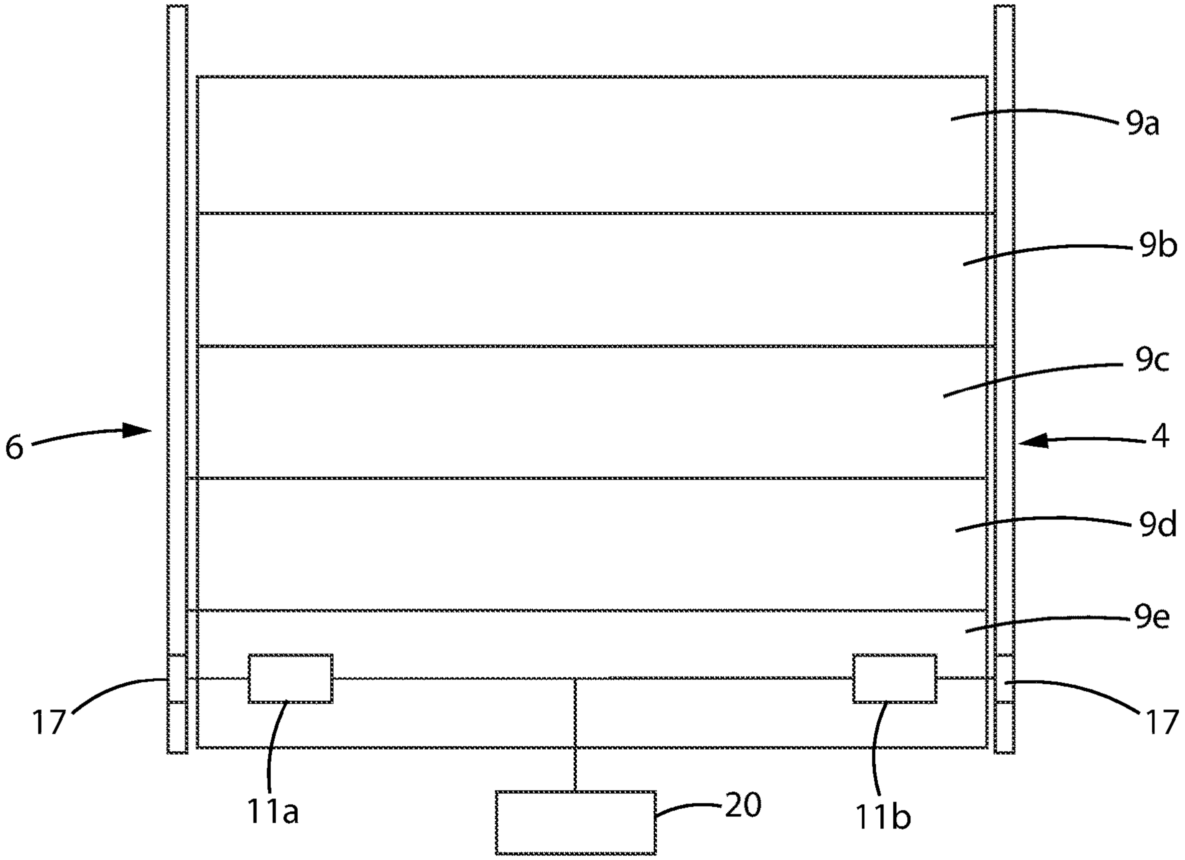
FIG. 3 is a schematic perspective view of a door operator system comprising a door in a closed position.

Turning to FIG. 3, which more closely depicts an overhead door operator system in which the drive unit comprises two motors 11*a*, 11*b*. The first 11*a* and second motor 11*b* may be arranged on the same horizontal section 9*e* of the door 8. The first and second motor may be arranged on the bottommost horizontal section 9*e* of the door 8. The first motor 11*a* and the second motor 11*b* may be mounted at different vertical sides of the door 8, e.g. the first motor 11*a* may be disposed at a vertical side of the door 8 proximal to the first side 7 of the opening and the second motor 11*b* may be disposed at a vertical side of the door 8 proximal to the second side 5 of the opening.

In one embodiment, the drive unit 10 at least comprises a first motor 11*a* and a second motor 11*b*, the first motor 11*a* and the second motor 11*b* may be mounted at the same vertical sides of the door 8. The first and second motor may be arranged on the same horizontal section of the door 8. The first and second motor may be arranged on the bottommost horizontal section 9*e* of the door 8.

In one embodiment, the first motor 11*a* is moveably connected to the first elongated transmission member 19 by means of the first driven transmission member 18 and the second motor 11*b* is moveably connected to the second elongated transmission member 19 by means of the second driven transmission member 18.

The motors 11 and the drive unit 10 are preferably arranged on the same main phase of the door 8, e.g. an outer or inner phase of the door 8. To protect the motors 11 and drive unit 10, said motors and drive unit are arranged on an inner phase of the door in the form of an interior facing door phase of the door 8.

In one embodiment, the motor(s) 11 of the drive unit 10 is a direct current DC motor 11. In a preferred embodiment, the motor(s) 11 is a brushless direct current (BLDC) motor (s).

A control unit may be in operative communication with the drive unit 10. The control unit may be in wired communication with the two motors 11*a*, 11*b* or be in a wireless communication.

The control unit is configured to control the movement of the drive unit 10, i.e. when and how the drive unit 10, and its associated motors 11*a*, 11*b*, should move the door 8. The control unit is arranged to receive input of if the door 8 should be opened or closed. In one embodiment, the control unit is arranged to receive the input from one or more of a user interface, a mechanical button or a remote control. In one embodiment, the control unit is arranged to receive input from sensors for automatic operation of the door.

The drive unit may further comprise additional motors which will now be described further.

Figure 4A:
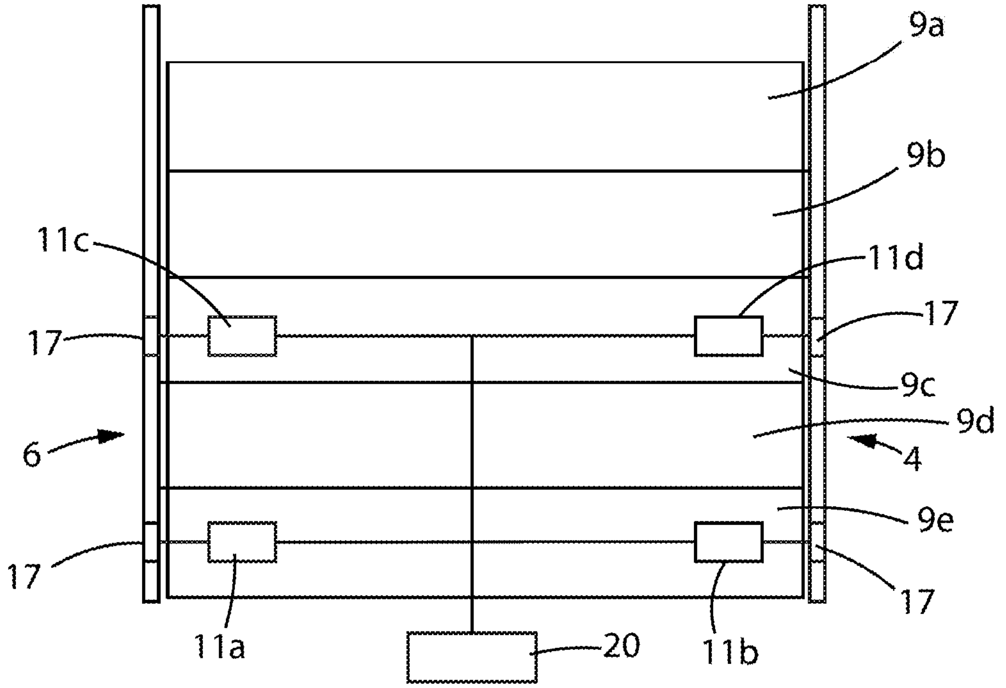
FIG. 4*a* is a schematic perspective view of a door operator system according to an embodiment, the door operator system comprising a door in a closed position.

In one embodiment schematically depicted in FIG. 4*a*, the drive unit 10 comprise a third and a fourth motor 11*c-d* mounted on a second horizontal section 9 of the horizontal sections and arranged to assist the first and second motors 11*a-b* when moving the sectional door 8 from the closed position C to the open position O. The third and fourth motors 11 are connected to the control unit 20 and arranged to be controlled by the control unit in the same way as described above in relation to the first and second motor 11. In one embodiment, the system 1 comprises four motors 11*a-d* and one control unit 20. The first and second motor 11*a*, 11*b* are arranged on one section 9*e* and the third and fourth motor 11*c*, 11*d* are arranged on another section 9*c*. The drive unit 10 may hence comprise a third driven transmission member 18 mounted to the door 8. The third driven transmission member 18 being movably connected to the first elongated transmission member 19 for driving said third driven transmission member 19 along said first elongated transmission member 19. Further, the drive unit may comprise a fourth driven transmission member 18 mounted to the door 8. The fourth driven transmission member 18 being movably connected to the second elongated transmission member 19 for driving said fourth driven transmission member 19 along said second elongated transmission member 19 for driving said fourth driven transmission member 19 along said second elongated transmission member 19. The drive unit may further comprise guide wheels and guide rollers associated with the third and fourth driven transmission member in accordance with what is described with reference to FIG. 2*a-c*.

In one embodiment, the first and second motor 11*a*, 11*b* are arranged on a section 9*e* that is located on the section 9 of the door being closest to the floor in the closed position C. However, it should be noted that the section 9*e* could for example also be the section 9*d* which is the section being arranged next to the section being closest to the floor in the closed position C.

Figure 4B:
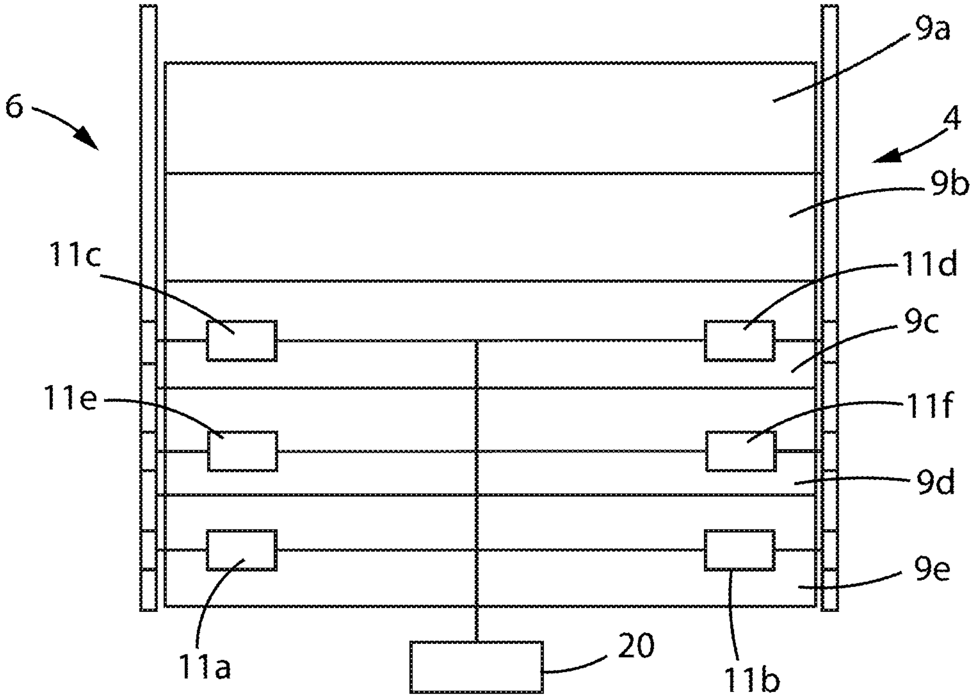
FIG. 4*b* is a schematic perspective view of a door operator system according to an embodiment, the door operator system comprising a door in a closed position.

In one embodiment schematically depicted in FIG. 4*b*, the drive unit 10 comprise a fifth and a sixth motor 11*e-f* mounted on a third horizontal section 9 of the horizontal sections 9 and arranged to assist the other motors 11 when moving the sectional door 8 from the closed position C to the open position O. The fifth and sixth motors 11*e-f* are connected to the control unit 20 and arranged to be controlled by the control unit in the same way as described above in relation to the first and second motor 11*a-b*. In one embodiment, the system 1 comprises six motors 11*a-f* and one control unit. The first and second motor 11*a*, 11*b* are arranged on one section 9*e*, the third and fourth motor 11*c*, 11*d* are arranged on another section 9*c*, and the fifth and sixth motor 11*e*, 11*f* are arranged on another section 9*d*. The drive unit 10 may hence comprise a fifth driven transmission member 18 mounted to the door 8. The fifth driven transmission member 18 being movably connected to the first elongated transmission member 19 for driving said fifth driven transmission member 19 along said first elongated transmission member 19. Further, the drive unit may comprise a sixth driven transmission member 18 mounted to the door 8. The sixth driven transmission member 18 being movably connected to the second elongated transmission member 19 for driving said sixth driven transmission member 19 along said second elongated transmission member 19 for driving said sixth driven transmission member 19 along said second elongated transmission member 19. The drive unit may further comprise guide wheels and guide rollers associated with the fifth and sixth driven transmission member in accordance with what is described with reference to FIG. 2*a-c*.

In the embodiments where additional sections 9*a-e* are arranged with motors, these may be arranged on every other section, every section or at one section being arranged above the section 9*e*.

In one embodiment the first, second, third or the first, second, third and fourth motor may be arranged on a section 9. Preferably, said motors may be arranged on the bottommost section 9*e*.

In one embodiment, at least one motor 11 of the drive unit 10 is configured to brake the movement of the door 8 when the door 8 is moved from the open position O to the closed position C. In one embodiment in which the operator system has two motors, both the first and second motor 11*a* and 11*b* are configured to brake the movement of the door 8 when the door 8 is moved from the open position O to the closed position C.

In one embodiment, at least one motor 11 of the drive unit 10 is configured to act as a generator and to charge the at least one energy storage device when the door 8 is moved from the open position O to the closed position C. In one embodiment, both the first and second motor 11*a*, 11*b* of the drive unit 10 is configured to act as a generator and to charge the at least one energy storage device when the door 8 is moved from the open position O to the closed position C. Due to the weight of the door 8 forcing the door towards the closed position, the at least one motor of the drive unit is caused to rotate, whereby the motor may generate power for charging said energy storage device.

At least one motor 11 of the drive unit 10 may further comprise a brake. In one embodiment, both the first 11*a* and the second motor 11*b* comprises the brake. In one embodiment, the brake is an electromagnetic brake. The brake is arranged to control/reduce the speed of the door 8 when it is moved from the open position O to the closed position C. In one embodiment, the brake is arranged to keep the door from moving in any position along the trajectory of door between the closed position and open position.

In one embodiment, the drive unit 10 is mounted to a section 9*e*, i.e. one of said plurality of horizontal and interconnected sections, of the door 8. The first motor 11*a* and the second motor 11*b* are arranged on the same section 9*e*. Preferably, the first motor 11*a* and the second motor 11*b* are arranged at different vertical sides of the section 9*e*. Each motor 11*a*, 11*b* is thus arranged in conjunction to the first frame section 4 and the second frame section 6, respectively.

In one embodiment, the door 8 could be horizontal, or at least at an angle in view of the closed position C, and the door 8 is positioned inside of the opening 2 and above the opening 2. When moving from the closed position C to the open position O, the sections 9 of the door that are interconnected will push on each other such that the whole door 8 will move upwards. The sections 9 will rotate and move in relation to each other when moving from a vertical position to the horizontal position.

In one embodiment, at least one of the first and second motor 11 is run as a generator 11 when moving the door 8 from the open position O to the closed position C. As the sprocket(s) 18 are rotated the generator 11 is rotated. The generator 11 reduces the speed of the door 8. The generator 11 that is connected to the energy storage device charges said energy storage device when moved. By using the kinetic energy of the moving door 8 the energy storage device is charged.

As will be described in more detail with reference to FIG. 5-7, the overhead door operator system comprises a transmission mounting arrangement 100, 200, 300. The transmission mounting arrangement 100, 200, 300 is for attaching the elongated transmission member 19.

The transmission mounting arrangement 100, 200, 300 comprises a fixing point 101, 201, 301. The elongated transmission member 19 is mounted to said fixing point 101, 201, 301. The fixing point 101, 201, 301 is arranged at a horizontal distance d in the direction of the horizontally extending part 4*b*, 6*b* relative the vertically extending part 4*b*, 6*b* at least when the door is in the open position O. The fixing point 101, 201, 301 may be in the form a clamp connection or a fastening arrangement. In one embodiment, the fixing point 101, 201, 301 may be in the form of a plate. The plate may be capable to support the entire weight of the door 8. The plate may be attached to the wall surrounding the opening 2 and/or the frame 3. The plate may be made of steel.

In one embodiment, the transmission mounting arrangement 100, 200, 300 is arranged proximal to an upper edge of the opening 2. The transmission mounting arrangement 100, 200, 300, i.e. the fixing point 101, 201, 301 of the transmission mounting arrangement 100, 200, 300, may be arranged at a position which is higher than the door 8 when the door 8 is in the open position.

As previously described with reference to FIG. 2*a*-*e*, the overhead door system may comprise the first elongated transmission member extending along the first side 7 of the opening 2 and the second elongated transmission member 19 extending along the second side 5 of the opening 2. The overhead door operator system 1 may further comprise the first and second driven transmission member 18 arranged to interplay with the first and second elongated transmission member 19 by means of the first and second elongated transmission member 19 at least partially wrapping around the first and second driven transmission member 18, respectively.

Thus, the transmission mounting arrangement may comprise a first fixing point 101, 201, 301 and a second fixing point 101, 201, 301. The first elongated transmission member 19 is mounted to first fixing point. The second elongated transmission member 19 is mounted to the second fixing point. The first and second fixing point are each arranged at a horizontal distance d in the direction of the horizontally extending part 4*b*, 6*b* relative the vertically extending part 4*a*, 6*a*, respectively, at least when the door is in the open position O.

Accordingly, the first fixing point is arranged at the horizontal distance d in the direction of the horizontally extending part 4*b* of the first frame section 4 relative the vertically extending part 4*a* of said first frame section 4, at least when the door is in the open position O.

Correspondingly, the second fixing point is arranged at the horizontal distance d in the direction of the horizontally extending part 6*b* of the second frame section 6 relative the vertically extending part 6*a* of said section frame section 6, at least when the door is the open position O.

In one embodiment, the bottom end 68 of the elongated transmission member 19 is attached to a fix point by means of a spring arrangement 74. This allows for tensioning of the elongated transmission member 19 which is particularly advantageous in conjunction with the transmission mounting arrangement 100, 200, 300. The combination of the tensioned elongated transmission member and the transmission mounting arrangement together reduces the wear on the components of the components of the overhead door operator system.

In one embodiment, a second end opposite to the first end, is attached to the fixing point 101, 201, 301. In one embodiment, the elongated transmission member 19 may extend above the transmission mounting arrangement 100, 200, 300, whereby a portion of the elongated transmission member 19 may be attached to fixing point 101, 201, 301 of the transmission mounting arrangement 100, 200, 300.

To save space, the fixing point may at least when the door 8 in the open position be arranged below the horizontally extending part 4*b*, 6*b* of the frame section 4, 6.

Figure 5A:
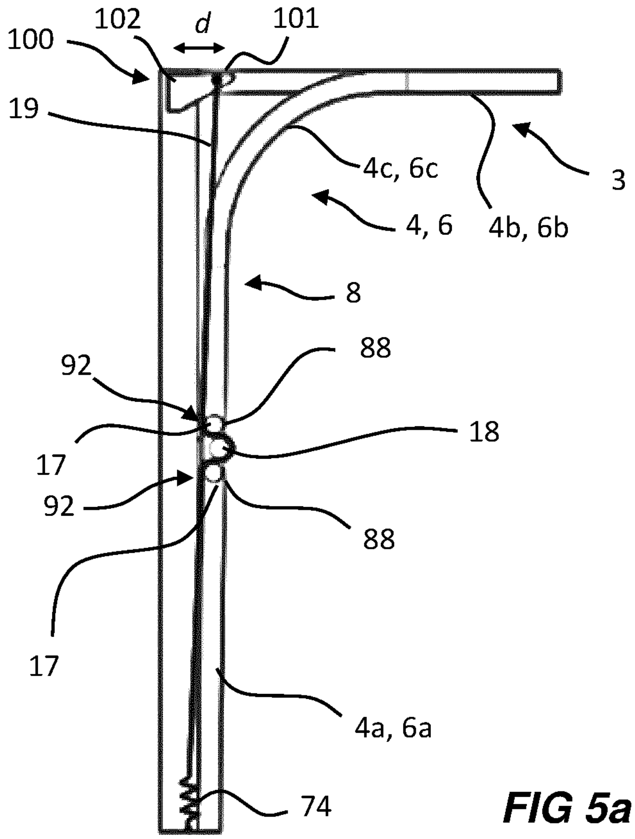
FIG. 5*a* is a schematic side view of a door operator system according to an embodiment, the door operator system comprising a door in a partially open position.
Figure 5B:
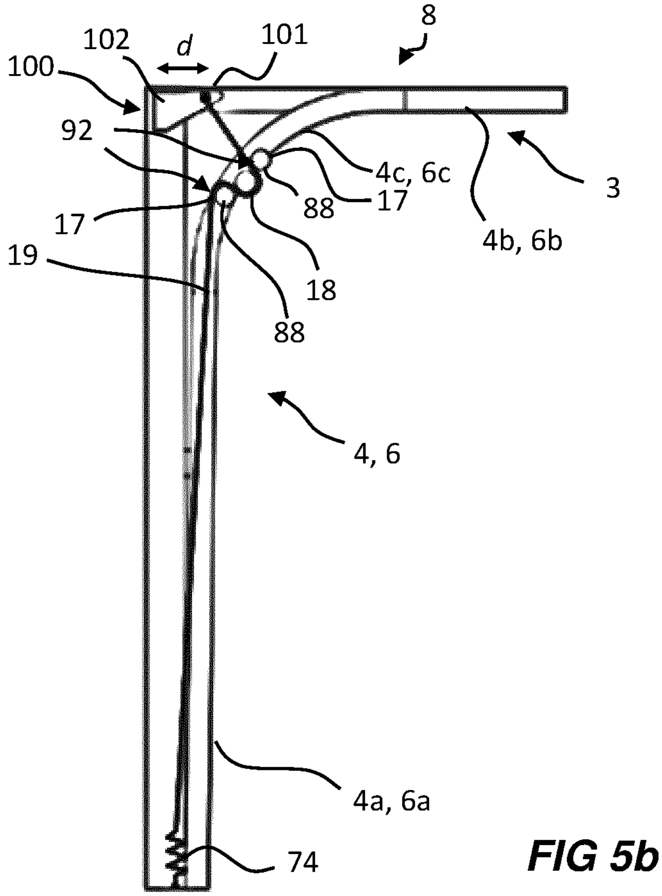
FIG. 5*b* is a schematic side view of a door operator system according to an embodiment, the door operator system comprising a door in an open position.

Referencing FIGS. 5*a*-*b*, the transmission arrangement 100 comprises a fixed bracket 102. The fixed bracket 102 comprises the fixing point 101. Thus, the fixing point 101 is stationary. Hence, the horizontal distance d is fixed. In one embodiment, the horizontal distance d may be between 0.05 and 1 meter.

As depicted in FIG. 5*a*-*b*, the fixed bracket 102 may be arranged below the horizontally extending part 4*b*, 6*b* of the frame section 4, 6. In other words, the fixing point 101 may be arranged below the horizontally extending part 4*b*, 6*b* of the frame section 4, 6. Hence, the fixed bracket 102 and/or the fixing point 101 may be arranged at a height in relation to a floor of the opening lower than the height of the horizontally extending part 4*b*, 6*b* of the frame section 4, 6. This allows for mounting of the overhead door operator system even if there is limited space above the opening while preventing the wear of the components of the overhead door operator.

The offset distance between the vertically extending part and the fixing point in the direction of the vertical horizontal direction increases the support for the elongated transmission member when the door travels through the bent interconnecting part of the frame section. Compared to a conventional system where the fixing point is aligned with vertically extending part of the frame section, the offset positions the elongated transmission member to support the movement of the door through the interconnecting bent part of the frame section. This reduces the strain and wear on the components of the overhead door system, i.e. the driven transmission member, the elongated transmission member and the guide members, which increases the service life of the overhead door operator system.

Such an arrangement allows for reduced wear without introducing additional moving parts and complexity to the overhead door operator system. This makes it particularly suitable for situations where there are some space available for mounting the transmission mounting arrangement 100, i.e. HL and SL overhead door operator systems.

As depicted in FIG. 5*a*-*b*, the drive unit may be mounted to the bottommost section of the door 8. This is particularly advantageous since it allows for the bottommost section to push the remaining sections of the door 8, which reduces the wear on the components of the overhead door operator system and the torque required to move the door to the open position O.

FIG. 5*a* shows the door in a partially open position, i.e. a partially open vertical position. The section of the door 8 which is provided with the drive unit has hence not travelled to the interconnecting bent part 4*c*, 6*c* of the frame section 4, 6. The section of the door 8 provided with the drive unit is thus substantially vertical.

FIG. 5*b* shows the door 8 in the open position. The section of the door 8 provided with the drive unit has thus travelled to the interconnecting bent part 4*c*. The section of the door 8 provided with the drive unit thus has an inclined orientation following the shape of the interconnecting bent part 4*c*. The horizontal distance d and the consequent offset between the vertically extending part 4*a*, 6*a* of the frame section 4, 6 allows for the portion of the elongated transmission member 19 extending between fixing point 101 and the section provided with the drive unit to have a more vertical orientation compared a conventional arrangement where the fixing point is aligned with the vertically extending part 4*a*, 6*a* of the frame section 4, 6. This allows for additional support for said section being provided with the drive unit.

FIG. 6-7 discloses embodiments with a movable fixing point 201, 301. Accordingly, the fixing point 201, 301 is movable and attached to the elongated transmission member 19 to move in response to the movement of the door 8. The fixing point 201, 301 is arranged to be disposed at the horizontal distance d in the direction of the horizontally extending part 4*b*, 6*b* relative the vertically extending part 4*a*, 6*a* when the door (8) is in the open position (O).

The movement of the driven section, i.e. the section provided with the drive unit will thus cause movement of the fixing point due to the motion being transferred to said fixing point by means of the elongated transmission member 19.

Hence, the fixing point 201, 301 is provided on a movable member 202, 303. The movable member is arranged to move between a first position when the door 8 is in the open position and a second position when the door 8 is in the closed position. The fixing point 201, 301 is disposed at the horizontal distance d in the direction of the horizontally extending part 4*b*, 6*b* relative the vertically extending part 4*a*, 6*a*. The movable member 202, 303, may be in the form of a lever arm 202 as depicted in FIG. 6*a-d* or a movable fixing member 303 in FIG. 7*a-d.*

The movable fixing point allows for support for the lifting without requiring much space above the door. Instead, the transmission mounting arrangement may be provided at a height substantially aligned with the horizontally extending part of the track. Thus, a more space efficient overhead door operator system which is less susceptible for wear is achieved. This makes it particularly advantageous in an SL or LL door overhead door operator system.

Figure 6A:
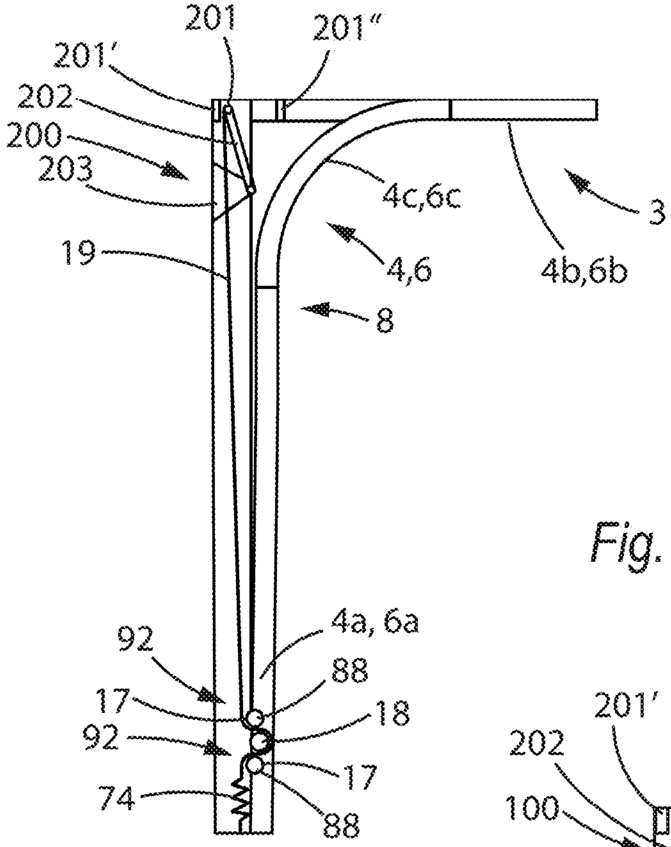
FIG. 6*a* is a schematic side view of a door operator system according to an embodiment, the door operator system comprising a door in a closed position.
Figure 6B:
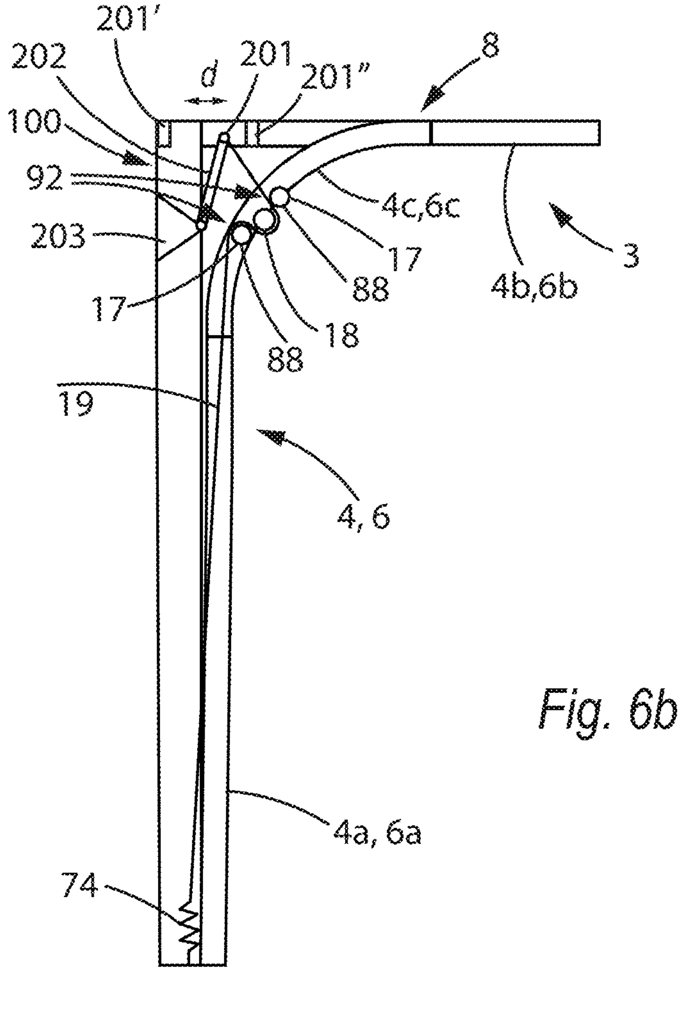
FIG. 6*b* is a schematic side view of a door operator system according to an embodiment, the door operator system comprising a door in an open position.

Turning to FIG. 6*a-b*, transmission mounting arrangement 200 may comprise a lever arm 202. The fixing point is disposed at a first end of the lever arm 202, the elongated transmission member 19 is thus attached to said first end of the lever arm 202. A second end of said lever arm 202 is pivotally mounted to a fixed lever bracket 203 of the transmission mounting arrangement 200 such that the lever arm 202 is in a first position when the door 8 is in the open position O and a second position when the door 8 is in the closed position and a second position when the door 8 is in the closed position C. The fixing point 201 is disposed at the horizontal distance d in the direction of the horizontally extending part 4*b*, 6*b* relative the vertically extending part 4*a*, 6*a* when the lever arm 202 is in the first position.

Such a lever arm arrangement is particularly advantageous in situations where only a small area is available above the door opening, i.e. in SL or LL overhead door operator systems. In such systems the bend, i.e. the bent interconnecting part is placed so low that the bottom panel of the door has partly or even fully travelled through the bend when fully opened. The lever arm thus effectively helps dragging the sections of the door through the interconnecting bent portion which reduces the wear on the driven transmission members and the elongated transmission member.

In one embodiment, the elongated transmission element 19 may have a substantially vertical orientation when the lever arm 202 is in the second position. In one embodiment, the elongated transmission member 19 may be parallel to the vertically extending part 4*a*, 6*a* when the lever arm 202 is in the second position.

In one embodiment, the transmission mounting arrangement 200 further comprises a dampening element 203' arranged to bias the movement of the lever arm 202. In one embodiment, the dampening element 203' may be a torsion spring arranged to bias the lever arm 202 in relation to the fixed lever bracket 203. The dampening element may smoothen the travel and avoid rapid changes in tension in the elongated transmission member due to changes in length of said elongated transmission member due to the movement of the lever, particularly when said elongated transmission member is biased.

As depicted in FIG. 6*a-b*, the fixed lever bracket 203 may be arranged below the horizontally extending part 4*b*, 6*b* of the frame section 4, 6. In other words, the second end of the lever arm 202, i.e. the end of the lever arm 202 which is pivotally connected to the fixed lever bracket 203, may be arranged below the horizontally extending part 4*b*, 6*b* of the frame section 4, 6. Hence, the fixed lever bracket 203 and/or the second end of the lever arm 202 may be arranged at a height in relation to a floor of the opening lower than the height of the horizontally extending part 4*b*, 6*b* of the frame section 4, 6. This allows for mounting of the overhead door operator system even if there is limited space above the opening while preventing the wear of the components of the overhead door operator.

In one embodiment, the fixed lever bracket 203 may be mounted to the frame 3. In one embodiment, the fixed lever bracket 203 may be mounted to a wall surrounding the opening.

FIG. 6*a* shows the door in a closed position. The section of the door 8 which is provided with the drive unit has hence not travelled to the interconnecting bent part 4*c*, 6*c* of the frame section 4, 6. The section of the door 8 provided with the drive unit is thus substantially vertical. As will be further described with reference to FIG. 6*c*, the lever arm 202 is in a position allowing for tensioning of the elongated transmission member 19.

The fixed lever bracket 203 may be provided with rotational stops 201', 201" arranged to prevent pivoting of the lever arm 202 beyond the first and second position, respectively. Accordingly, the lever arm 202 may be movable in an angular range defined by said rotational stops. In one embodiment, one of the stops 201' may be constituted by the wall surrounding the opening.

FIG. 6*b* shows the door 8 in the open position. The section of the door 8 provided with the drive unit has thus travelled to and/or may have travelled through the interconnecting bent part 4*c*. The section of the door 8 provided with the drive unit has thus an inclined orientation following the shape of the interconnecting bent part 4*c* or a horizontal orientation aligned with the horizontally extending part 4*b* 6*b*. The lever arm 202 has thus moved from the second position to the first position which provides the offset distance between the fixing point 201 and the additional torque provided by the lever effect supplied by the lever.

Figure 6C:
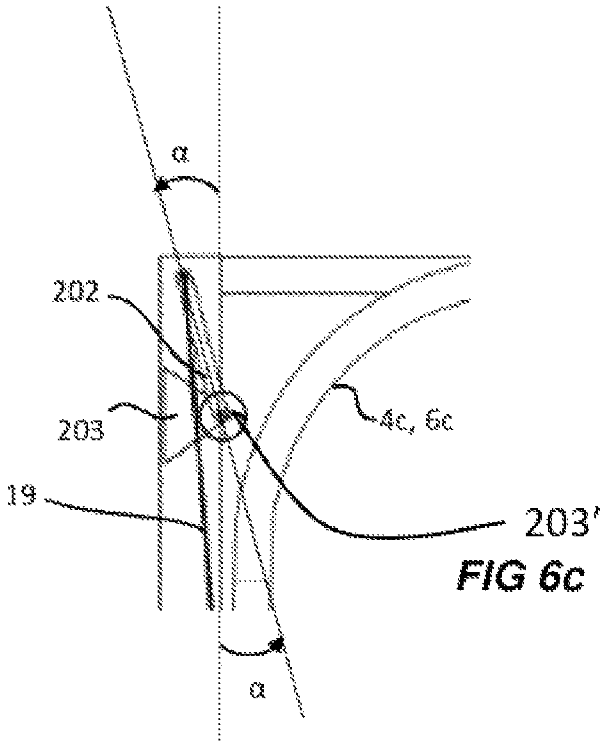
FIG. 6*c* is a schematic detailed view of the lever arm according to an embodiment when the door is in a partially open position.
Figure 6D:
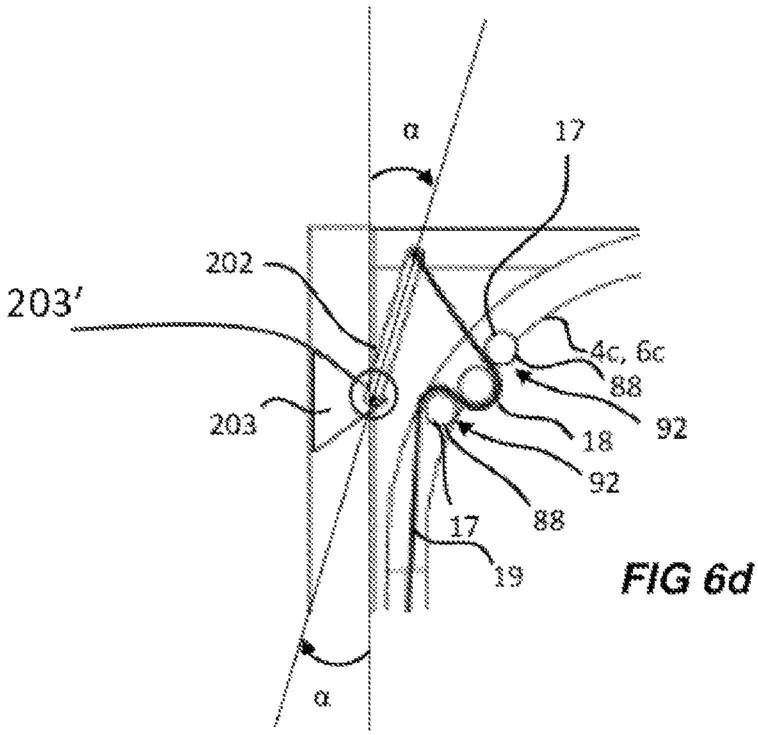
FIG. 6*d* is a schematic detailed view of the lever arm according to an embodiment when the door is in an open position.

As more closely depicted in FIG. 6*c-d*, the lever arm 202 is movable along an angle α relative the vertically extending part 4*a*, 6*a* between the first and second position. The angle α is between 10° and 45° relative a vertical plane in an outward direction facing away from the door 8 when the lever arm 202 is in the first position and is between 100 and 110° relative said vertical plane in an inward direction towards the door 8 when the lever arm 202 is in the second position. The vertical plane may be substantially parallel, and preferably aligned, with the door 8 when the door 8 is in the closed position C, i.e. the vertical closed position.

The above described rotational stops may thus be arranged to prevent rotation of the lever arm 202 beyond between 10° and 45° relative a vertical plane in an outward direction facing away from the door 8 and beyond between 100 and 1100 relative said vertical plane in an inward direction towards the door 8.

Turning to FIG. 7*a-d*, the transmission mounting arrangement 300 may comprise a guide track 302 and a fixing element 303. The fixing element 303 is movably mounted to the guide track 302. The fixing element 303 is provided with the fixing point 301 such that the fixing element 303 is in a first position when the door 8 is in the closed position and a second position when the door 8 is in the closed position. The fixing point 301 is disposed at the horizontal distance d in the direction of the horizontally extending part 4*b*, 6*b* relative the vertically extending part 4*a*, 6*a* when the fixing element 303 is in the first position.

Hence, when the driven section, i.e. the section provided with the drive unit moves upwards when the door 8 is in the partially open position, the fixing element 303 is still essentially in the second position since the part of the elongated transmission element 19 connecting the section provided with the drive unit and the fixing element 303 is essentially vertical. Upon said driven section reaching the interconnecting part 4*c*, 6*c*, the resulting inclined orientation of the elongated transmission element 19 causes the fixing element 303 to move in a direction towards the horizontally extending part 4*b*, 6*b* along the guide track 302. Once the door 8 has reached its open position, the fixing element 303 is on the horizontal distance d.

In one embodiment, the fixing element 303 may be spring-biased by biasing spring 303' for exerting a biasing force for returning the fixing element 303 to the second position. Accordingly, the fixing element 303 is guided along the guide track 302 back the second position when the door 8 moves towards the closed position. Thus, a desired tension is maintained in the elongated transmission member 19 and an unstable closing motion of the door 8 is mitigated.

In one embodiment, the fixing point 301 provided on the fixing element 303 is in the form of a clamp or loop connection attached to the elongated transmission member 19.

In one embodiment, the guide track 302 is mounted to the frame 3. In one embodiment, the guide track 302 is mounted to the wall surrounding the opening. The guide track 302 may be positioned proximal to the upper edge of the opening 2. The guide track 302 may be arranged at a similar height as the horizontal part 4*b*, 6*b* of the frame.

In one embodiment, the fixing element 303 comprises a gliding block or rolling element for interfacing with the guide track 302. Accordingly, the fixing element 303 may have a glide surface in gliding contact with the guide track 302 to allow for movement of the fixing element 303. Alternatively, the fixing element 303 comprises the rolling element, said rolling element being in rolling contact with the guide track 302 to allow for movement of the fixing element 303.

Figure 7A:
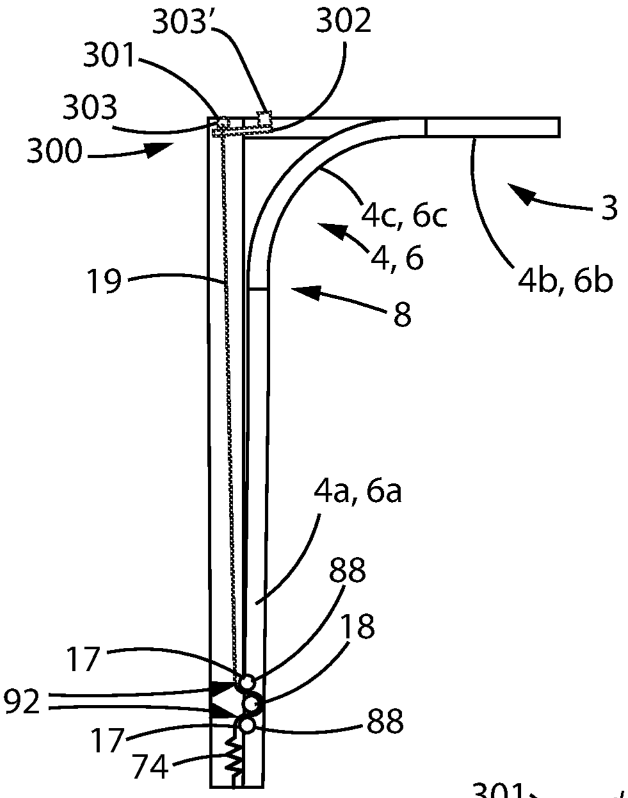
FIG. 7*a* is a schematic side view of a door operator system according to an embodiment, the door operator system comprising a door in a closed position.
Figure 7B:
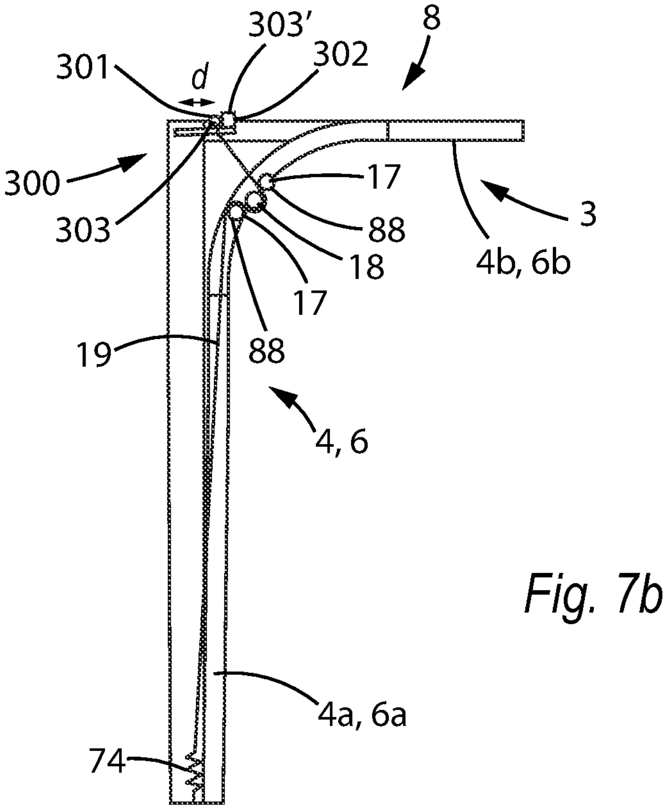
FIG. 7*b* is a schematic side view of a door operator system according to an embodiment, the door operator system comprising a door in an open position.
Figure 7C:
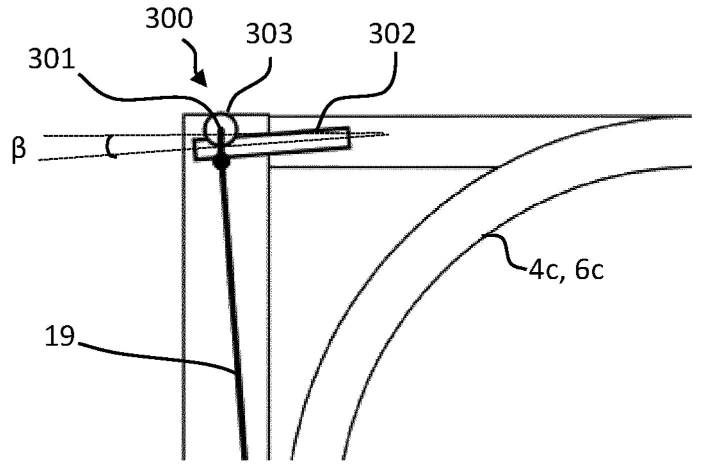
FIG. 7*c* is a schematic detailed view of the transmission mounting arrangement according to an embodiment when the door is in a partially open position.
Figure 7D:
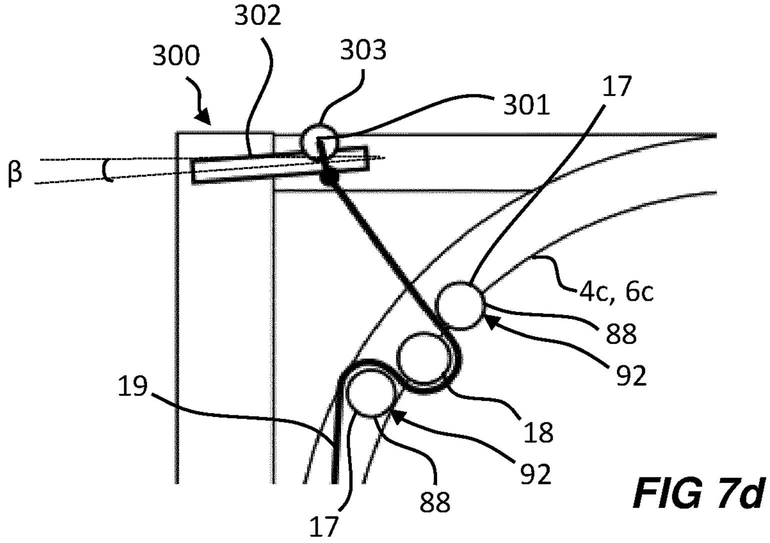
FIG. 7*d* is a schematic detailed view of the transmission mounting arrangement according to an embodiment when the door is in an open position.

As closer depicted in FIGS. 7*c-d*, the guide track 302 may be arranged in an upward inclination relative a horizontal plane. The inclined orientation of the guide track 302 maintains a desired tension and thereby support of the elongated transmission member 19 all throughout the motion of the section provided with the drive unit through the interconnecting part 4*c*, 6*c*. In one embodiment, the guide track 302 may be oriented in an angle ß relative the horizontal plane, the angle ß being between 5° and 45°. The horizontal plane may be aligned with the horizontally extending part 4*b*, 6*b*. The inclined orientation of the guide track 302 allows for easier closing of the door 8 and additional support for the opening motion of the door 8.

To achieve further additional support to the movement of the door 8, the guide track 302 may be proximal to the interconnecting part 4*c*, 6*c*. In one embodiment, the guide track 302 is arranged at a similar height as the horizontally extending part 4*b*, 6*b*.

The invention has been described above in detail with reference to embodiments thereof. However, as is readily understood by those skilled in the art, other embodiments are equally possible within the scope of the present invention, as defined by the appended claims. It is recalled that the invention may generally be applied in or to an entrance system having one or more moveable door member not limited to any specific type. The or each such door member may, for instance, be a swing door member, a revolving door member, a sliding door member, an overhead sectional door member, a horizontal folding door member or a pull-up (vertical lifting) door member.

The invention claimed is:

1. An overhead door operator system for opening and closing an opening, comprising:

- a door frame comprising a first frame section at a first side of the opening and a second frame section at a second side of the opening, each of the first frame section and the second frame section comprising a vertically extending part, a horizontally extending part and a bent interconnecting part;
- a door arranged to be moved between an open (O) and a closed (C) position, the door being movably connected to the door frame, the door comprising a plurality of horizontal and interconnected sections;
- a drive unit mounted on the door, the drive unit comprising at least one motor arranged to move the door from the closed position (C) to the open position; and
- an elongated transmission member extending vertically along the first side of the opening,
- wherein the drive unit further comprises a driven transmission member including a cogged wheel, sprocket, or ribbed wheel in driving connection with the motor, the driven transmission member being movably connected to the elongated transmission member and arranged to interplay with said elongated transmission member for driving the driven transmission member vertically along said elongated transmission member by means of the elongated transmission member at least partially wrapping around the cogged wheel, sprocket, or ribbed wheel of the driven transmission member, the overhead door operator system further comprising a transmission mounting arrangement for attaching the elongated transmission member, said transmission mounting arrangement comprising a fixing point to which the elongated transmission member is mounted, wherein the transmission mounting arrangement comprises a lever arm, wherein the fixing point is disposed at a first end of the lever arm, wherein the fixing point mounts a top end of the elongated transmission member with the first end of the lever arm and a second end of the lever arm is pivotally mounted to a fixed lever bracket of the transmission mounting arrangement, wherein the fixed lever bracket is mounted to the door frame or to a wall surrounding the opening such that the lever arm is in a first position when the door is in the open position (O) and a second position when the door is in a partially open position, wherein the fixing point is disposed vertically above the bent interconnecting part when the lever arm is in the first position.

2. The overhead door operator system according to claim 1, wherein the lever arm is movable along an angle (a) relative the vertically extending part between the first and second position, wherein the angle (a) is between 10° and 45° relative a vertical plane in an outward direction facing away from the door when the lever arm is in the-second position and is between 10° and 110° relative said vertical plane in an inward direction towards the door when the lever arm is in the first position.

3. The overhead door operator system according to claim 1, wherein the transmission mounting arrangement further comprises a dampening element arranged to bias the movement of the lever arm.

4. The overhead door operator system according to claim 1, wherein the fixed lever bracket is provided with rotational stops arranged to prevent pivoting of the lever arm beyond the first and second position, respectively.

5. The overhead door operator system according to claim 1, wherein the elongated transmission member is in the form of a bendable transmission member.

6. The overhead door operator system according to claim 1, wherein the elongated transmission member is biased.

7. The overhead door operator system according to claim 6, wherein a bottom end of the elongated transmission member is attached to a fix point by means of a spring arrangement.

8. The overhead door operator system according to claim 1, wherein the drive unit is mounted to a bottommost section of the door.

9. The overhead door operator system according to claim 1, wherein the fixing point is movable and attached to the elongated transmission member to move in response to a movement of the door, the fixing point being displaced away from the horizontally extending part when the door is moved from the open position (O) toward the closed position (C).

* * * * *